US011880331B2

(12) United States Patent
Bristow et al.

(10) Patent No.: US 11,880,331 B2
(45) Date of Patent: *Jan. 23, 2024

(54) TESTING CURRENT DRAW CAPACITY FROM AN UNKNOWN USB SUPPLY

(71) Applicant: ARRIS Enterprises LLC, Suwanee, GA (US)

(72) Inventors: Antony J. Bristow, Halifax (GB); Adrian K Woodhouse, West Yorkshire (GB)

(73) Assignee: ARRIS ENTERPRISES LLC, Horsham, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/939,484

(22) Filed: Sep. 7, 2022

(65) Prior Publication Data

US 2023/0004520 A1  Jan. 5, 2023

Related U.S. Application Data

(63) Continuation of application No. 16/718,538, filed on Dec. 18, 2019, now Pat. No. 11,474,968.

(60) Provisional application No. 62/781,191, filed on Dec. 18, 2018.

(51) Int. Cl.
*G06F 13/42* (2006.01)

(52) U.S. Cl.
CPC .. *G06F 13/4282* (2013.01); *G06F 2213/0042* (2013.01)

(58) Field of Classification Search
CPC .................................................. G06F 13/4282
USPC .................................................. 710/8
See application file for complete search history.

(56) References Cited

U.S. PATENT DOCUMENTS

| 2,264,066 A | 11/1941 | Buchard |
| 2,552,504 A | 5/1951 | Lugosch |
| 2,691,747 A | 10/1954 | Griffin |
| 2,826,737 A | 3/1958 | Crumbliss |
| 3,289,081 A | 11/1966 | Brunetto |

(Continued)

OTHER PUBLICATIONS

International Search Report dated Apr. 16, 2020 in International (PCT) Application No. PCT/US19/67048.

(Continued)

*Primary Examiner* — Paul R. Myers
(74) *Attorney, Agent, or Firm* — Wenderoth, Lind & Ponack, L.L.P.

(57) ABSTRACT

Methods, systems, and computer readable media can be operable to facilitate a testing of an unknown USB supply that is connected to a CPE (customer premise equipment) device to determine a current draw capacity of the USB supply. The CPE device may test the USB supply to determine whether the USB supply is capable of supplying a predetermined current. If the determination is made that the USB supply is not able to supply the predetermined current, an end-user may be instructed to plug an alternative PSU (power supply unit) into the CPE device, wherein the alternative PSU is capable of supplying the predetermined current to the CPE device. The CPE device may output an indication that an alternative PSU should be used via a graphics output to a display device through an HDMI (high-definition multimedia interface) connection or via an LED indication using one or more LEDs at the CPE device.

20 Claims, 8 Drawing Sheets

(56) References Cited

U.S. PATENT DOCUMENTS

| | | |
|---|---|---|
| 3,406,341 A | 10/1968 | Kupferberg |
| 3,624,489 A | 11/1971 | Betton |
| 3,995,175 A | 11/1976 | Hoyt |
| 4,037,156 A | 7/1977 | Goujon |
| 4,586,118 A | 4/1986 | Mihalka |
| 4,775,640 A | 10/1988 | Chan |
| 5,938,770 A | 8/1999 | Kim |
| 6,067,628 A | 5/2000 | Krithivas |
| 6,105,143 A | 8/2000 | Kim |
| 6,167,349 A | 12/2000 | Alvarez |
| 6,275,375 B1 | 8/2001 | Nam |
| 6,577,337 B1 | 6/2003 | Kang |
| 6,832,271 B1 | 12/2004 | Ivan |
| 7,535,195 B1 | 5/2009 | Horovitz |
| 8,242,629 B2 | 8/2012 | Palatini |
| 8,674,823 B1 | 3/2014 | Contario et al. |
| 10,026,574 B2 | 7/2018 | Lenz |
| 11,474,968 B2 * | 10/2022 | Bristow .............. G06F 13/4282 |
| 2001/0025349 A1 | 9/2001 | Sharood et al. |
| 2005/0114716 A1 | 5/2005 | O |
| 2007/0213946 A1 | 9/2007 | Saether |
| 2008/0056285 A1 | 3/2008 | Quinn |
| 2008/0133815 A1 | 6/2008 | Mori |
| 2009/0164824 A1 | 6/2009 | Langgood |
| 2009/0167190 A1 | 7/2009 | Hickey |
| 2010/0060303 A1 | 3/2010 | Beckmann |
| 2010/0180055 A1 | 7/2010 | Lyon |
| 2011/0006603 A1 | 1/2011 | Robinson et al. |
| 2011/0068626 A1 | 3/2011 | Terlizzi et al. |
| 2011/0223963 A1 | 9/2011 | Vinayak |
| 2012/0026726 A1 | 2/2012 | Recker et al. |
| 2013/0013936 A1 | 1/2013 | Lin |
| 2013/0234668 A1 | 9/2013 | Kuo |
| 2014/0191033 A1 | 7/2014 | Wojcik |
| 2014/0195826 A1 | 7/2014 | Wojcik |
| 2015/0058670 A1 | 2/2015 | Suzuki |
| 2015/0160674 A1 | 6/2015 | Burdette |
| 2015/0362944 A1 | 12/2015 | Sporck |
| 2016/0356829 A1 | 12/2016 | Chen et al. |
| 2016/0378155 A1 | 12/2016 | Inha et al. |
| 2017/0040801 A1 | 2/2017 | Robison |
| 2017/0269664 A1 | 9/2017 | Garner et al. |
| 2017/0359005 A1 | 12/2017 | Ahmed |
| 2018/0120910 A1 | 5/2018 | Farkas et al. |

OTHER PUBLICATIONS

International Preliminary Report on Patentability dated Jun. 16, 2021 in International (PCT) Application No. PCT/US2019/067048.
Extended European Search Report dated Aug. 3, 2022 in European Application No. 19898502.0.
Office Action dated Aug. 25, 2023 in corresponding Canadian Application No. 3,123,588.

* cited by examiner

TESTING CURRENT DRAW CAPACITY FROM AN UNKNOWN USB SUPPLY

CROSS REFERENCE TO RELATED APPLICATION

This application is a non-provisional application claiming the benefit of U.S. Provisional Application Ser. No. 62/781,191, entitled "Testing Current Draw Capacity from an Unknown USB Supply," which was filed on Dec. 18, 2018, and is incorporated herein by reference in its entirety.

TECHNICAL FIELD

This disclosure relates to testing current draw capacity from an unknown USB supply.

BACKGROUND

In general, when a USB port is overloaded by a current draw, the USB port is shut down, and an end-user may be presented with an error feedback. Typically, a television USB port minimum current delivery is 500 mA. However, many USB ports will far out deliver than the spec (e.g., up to 7 A). It is desirable to provide methods and systems for preventing an overcurrent shutdown of a USB port while measuring the ability to pull a predetermined current (e.g., 1 A) from an unknown USB supply (e.g., a USB port of a television).

BRIEF DESCRIPTION OF THE DRAWINGS

Like reference numbers and designations in the various drawings indicate like elements.

DETAILED DESCRIPTION

It is desirable to provide methods and systems for preventing an overcurrent shutdown of a USB (universal serial bus) port while measuring the ability to pull a predetermined current (e.g., 1 A) from an unknown USB supply (e.g., a USB port of a television). In embodiments, an unknown USB supply (e.g., a USB port of a television) that is connected to a CPE (customer premise equipment) device (e.g., a STB (set-top box)) may be tested to determine a current draw capacity of the USB supply. For example, the CPE device may test the USB supply to determine whether the USB supply is capable of supplying a predetermined current (e.g., 1 A). If the determination is made that the USB supply is not able to supply the predetermined current, an end-user may be instructed to plug an alternative PSU (power supply unit) into the CPE device, wherein the alternative PSU is capable of supplying the predetermined current to the CPE device. For example, the CPE device may output an indication that an alternative PSU should be used via a graphics output to a display device through an HDMI (high-definition multimedia interface) connection or via an LED indication using one or more LEDs at the CPE device.

Figure 1:
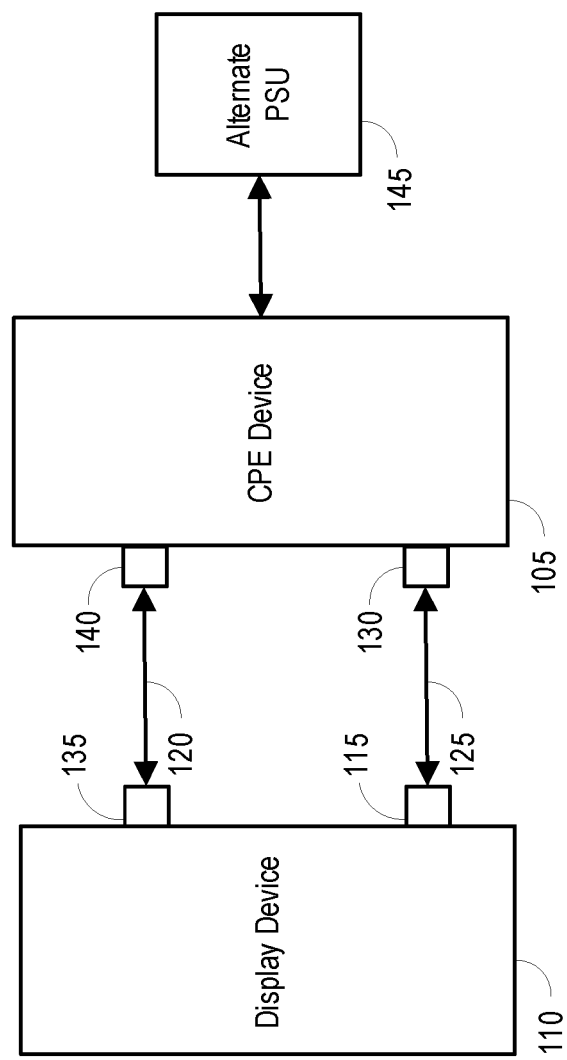
FIG. 1 is a block diagram illustrating an example CPE device that is connected to a display device, the CPE device being operable to facilitate current draw capacity testing.

FIG. 1 is a block diagram illustrating an example CPE device 105 that is connected to a display device 110, the CPE device 105 being operable to facilitate current draw capacity testing. In embodiments, a CPE device 105 (e.g., STB (set-top box), television dongle, or other multimedia device) may be connected to a display device 110 (e.g., television or other display device) through a connection to a USB port 115 of the display device 110, and the CPE device 105 may be further connected to the display device 110 through an HDMI connection (e.g., HDMI cable 120). For example, a USB cable 125 may be connected to the USB port 115 of the display device at one end and to a connector 130 (e.g., a USB port or other connector) of the CPE device 105 at the other end, and the HDMI cable 120 may be connected to an HDMI port 135 of the display device at one end and to a connector 140 (e.g., an HDMI port or other connector) of the CPE device 105 at the other end. As another example, the CPE device 105 may include a USB connector and/or an HDMI connector, each of which may be plugged directly into the USB port 115 of the display device 110 and/or the HDMI port 135 of the display device 110 respectively.

Upon each boot, a power test may be run by the CPE device 105, wherein the CPE device 105 tests the ability of an unknown USB supply (e.g., the USB port 115 of a display device 110 to which the CPE device 105 is connected) to supply a predetermined current. The predetermined current may be a current draw applied during a normal operation of the CPE device. When the current draw capacity test is initiated, the CPE device 105 may generate and apply a current load, wherein the current load is applied differently during the current draw capacity test than a current draw being applied during a normal operation of the CPE device. The power test may commence with a low (e.g., sub 500 mA) known DC loaded state in order to make sure that the system is good before the test commences. The power test may be completed without shutting down the unknown USB supply (e.g., the USB port 115 and/or the display device 110 to which the CPE device 105 is connected). The power test may be completed without having error messages generated by the display device 110 and displayed on the display device 110. The minimum current delivery of the USB supply may be 500 mA and CPE device 105 power during operation may vary from ~0.3 A to 1 A.

If, during the power test, the CPE device 105 determines that the unknown USB supply cannot supply the predetermined current, the CPE device 105 may output a notification instructing a user to plug the CPE device 105 into an alternative PSU (power supply unit) 145. The CPE device 105 may determine whether the USB port is capable of supporting the current draw applied during the normal operation of the customer premise equipment device, and the CPE device may output a notification when the determination is made that the USB port is not capable of supporting the current draw applied during the normal operation of the customer premise equipment device. For example, the CPE device 105 may generate a visual and/or audible notification, and the visual and/or audible notification may be output from the CPE device 105 to the display device 110 through the HDMI connection. The visual and/or audible notification may be displayed, or otherwise output, by the display device 110. As another example, the CPE device 105 may utilize one or more light indicators (e.g., LED(s)) to output an LED indication associated with the failed power test.

In embodiments, loading of the current draw may be carried out via a progressive loading. For example, current drawn from the unknown USB supply may be progressively loaded while monitoring the voltage at each stage to detect when it drops below a critical threshold, thereby indicating that the unknown USB supply will not be able to provide enough power. This may be accomplished by ramping up the SW drive in known steps until a predetermined current limit (e.g., 1 A) is reached.

In embodiments, loading of the current draw may be carried out via a pulsed loading. For example, a predetermined current load (e.g., 1 A) may be pulsed in a controlled manner in a duration that is short enough to prevent the overcurrent trip from fully activating. The current load may be pulsed by removing the full load periodically. The current load may be released as soon as possible once the threshold is triggered to avoid the possibility of overloading the USB supply to the point that the USB supply is disabled.

When using pulsed loading to generate a predetermined current load (e.g., 1 A), a steady state of SW may be utilized. During pulsed loading, the applied current load may be a pulsed current load that is equivalent to the current draw applied during the normal operation of the customer premise equipment device, wherein current load is removed periodically. For example, to generate a 1 A current load, a SW loader may be taken to ~400 mA and a known load (e.g., —600 mA) may then be applied to mimic a total of 1 A. It should be understood that the actual current values may be adjusted according to various parameters associated with a use case.

Figure 2:
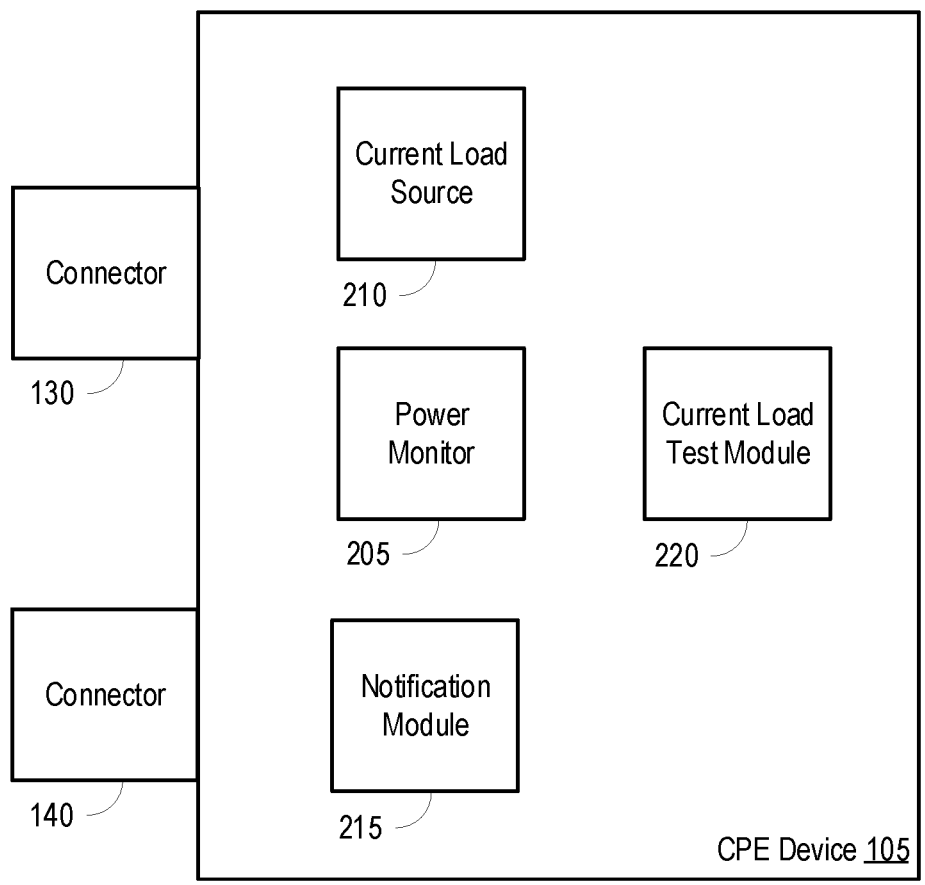
FIG. 2 is a block diagram illustrating an example CPE device that is operable to facilitate current draw capacity testing using a power monitor.

FIG. 2 is a block diagram illustrating an example CPE device 105 that is operable to facilitate current draw capacity testing using a power monitor 205. The CPE device 105 may include a power monitor 205, a current load source 210, a notification module 215, a current load test module 220, a connector 130, and a connector 140.

In embodiments, the CPE device 105 shown in FIG. 2 may test current draw capacity of an unknown USB supply (e.g., a USB port of a device to which the CPE device 105 is connected) using progressive loading. When progressive (i.e., stepped) loading is used, a predetermined current load (e.g., 1 A) may be sourced from current load source 210 by adding more functions in a controlled manner, and the current load test module 220 may read back voltage values from a power monitor 205 (e.g., I2C (inter-integrated circuit) power monitor). For example, at each respective one stage of one or more stages, the current load source 210 may increase a sourced amount of current (e.g., current sourced by SW or current sourced by the unknown USB supply may be increased by incremental amounts), and at the end of the respective stage, the current load test module 220 may read the resulting voltage value from the power monitor 205 and determine whether the voltage has dropped below a threshold. If the resulting voltage value is not below the threshold, the current load test module 220 may initiate a next stage at which the sourced amount of current is again increased and the resulting voltage value is read. The current load test module 220 may determine that the unknown USB supply cannot supply a predetermined current when the current load test module 220 identifies a voltage drop (from the voltage values recovered from the power monitor 205) below a critical threshold. The measured voltage may still be within a USB spec (e.g., >4.75V).

Figure 3:
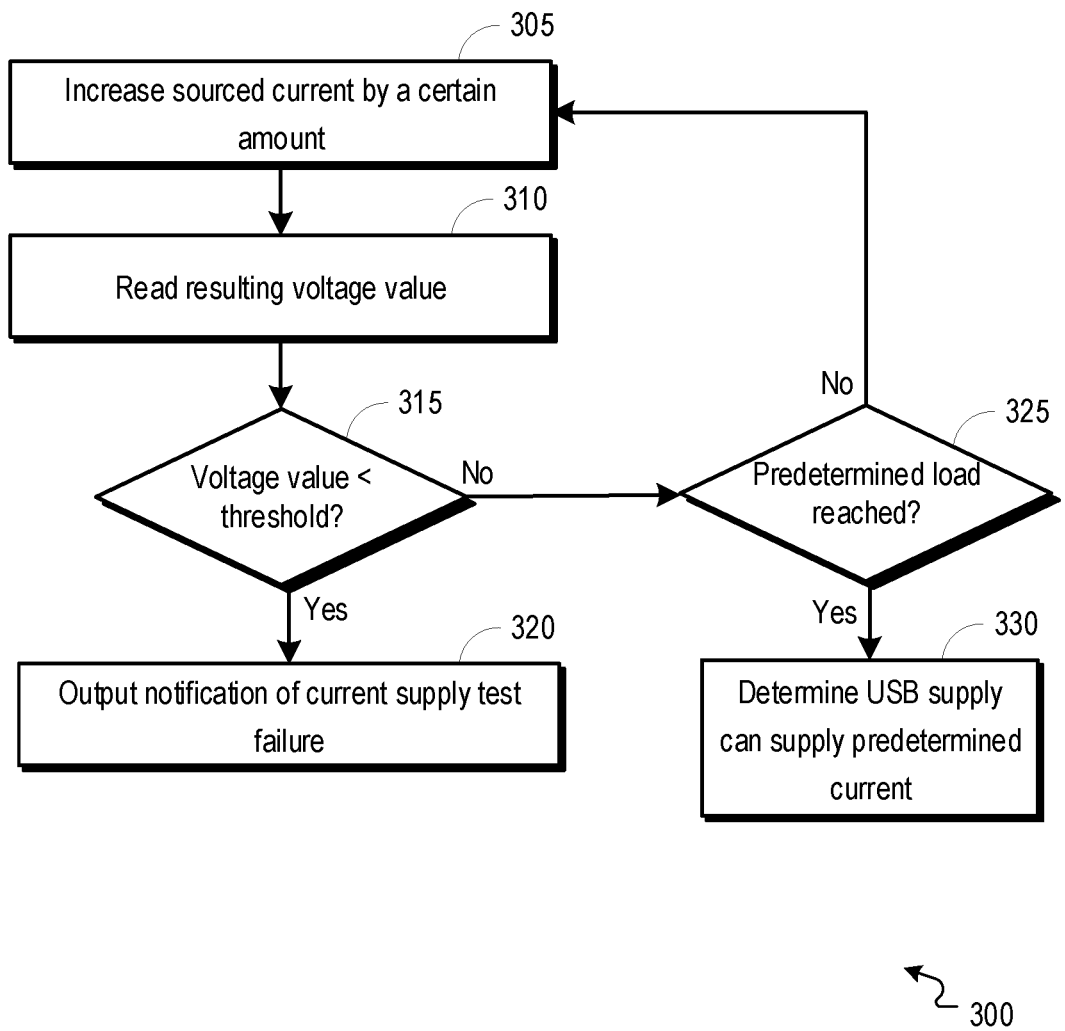
FIG. 3 is a flowchart illustrating an example process operable to facilitate current draw capacity testing using a power monitor.

FIG. 3 is a flowchart illustrating an example process 300 operable to facilitate current draw capacity testing using a power monitor. The process 300 may be carried out, for example, by a CPE device 105. The process 300 may begin when a procedure is initiated for testing an unknown USB supply to which the CPE device 105 is connected. For example, the testing procedure may be initiated when the CPE device 105 is connected to the USB supply (e.g., a USB port 115 of the display device 110 of FIG. 1) through a USB connection and/or an HDMI connection. The process 300 may begin at 305, where current sourced to the CPE device is increased by a certain amount. In embodiments, the current load source 210 of FIG. 2 may increase a sourced amount of current (e.g., current sourced by SW or current sourced by the unknown USB supply may be increased by an incremental amount), wherein the amount by which the sourced current is increased is less than a predetermined current that needs to be supplied to the CPE device 105.

At 310, a resulting voltage value may be read. For example, the current load test module 220 of FIG. 2 may read the resulting voltage value from the power monitor 205 of FIG. 2. The voltage value that is read may be the voltage value that is realized by the power monitor 205 in response to the increase in the sourced current.

At 315, a determination may be made whether the read voltage value is less than a threshold. In embodiments, the CPE device 105 may be configured with a critical threshold against which the voltage value read from the power monitor 205 is compared.

If, at 315, the determination is made that the read voltage value is less than the threshold, the process 300 may proceed to 320. At 320, the CPE device 105 may output a notification of the current supply test failure. In embodiments, the CPE device 105 may output a notification instructing a user to plug the CPE device 105 into an alternative PSU (power supply unit). For example, the CPE device 105 may generate a visual and/or audible notification, and the visual and/or audible notification may be output from the CPE device 105 to a display device. The visual and/or audible notification may be displayed, or otherwise output, by the display device. As another example, the CPE device 105 may utilize one or more light indicators (e.g., LED(s)) to output an LED indication associated with the failed power test.

If, at 315, the determination is made that the read voltage value is not less than the threshold, the process 300 may proceed to 325. At 325, a determination may be made whether the sourced current load resulting from the increase at 305 has reached the predetermined current load that needs to be supplied to the CPE device 105 by the USB supply. If the predetermined current load has not been reached, the sourced current may again be increased by a certain amount at 305. If the predetermined current load has been reached, the CPE device 105 may determine that the USB supply to which the CPE device 105 is connected can supply the predetermined current at 330. As a result of the determination that the USB supply is capable of supplying the predetermined current, the CPE device 105 may end the current supply test.

Figure 4:
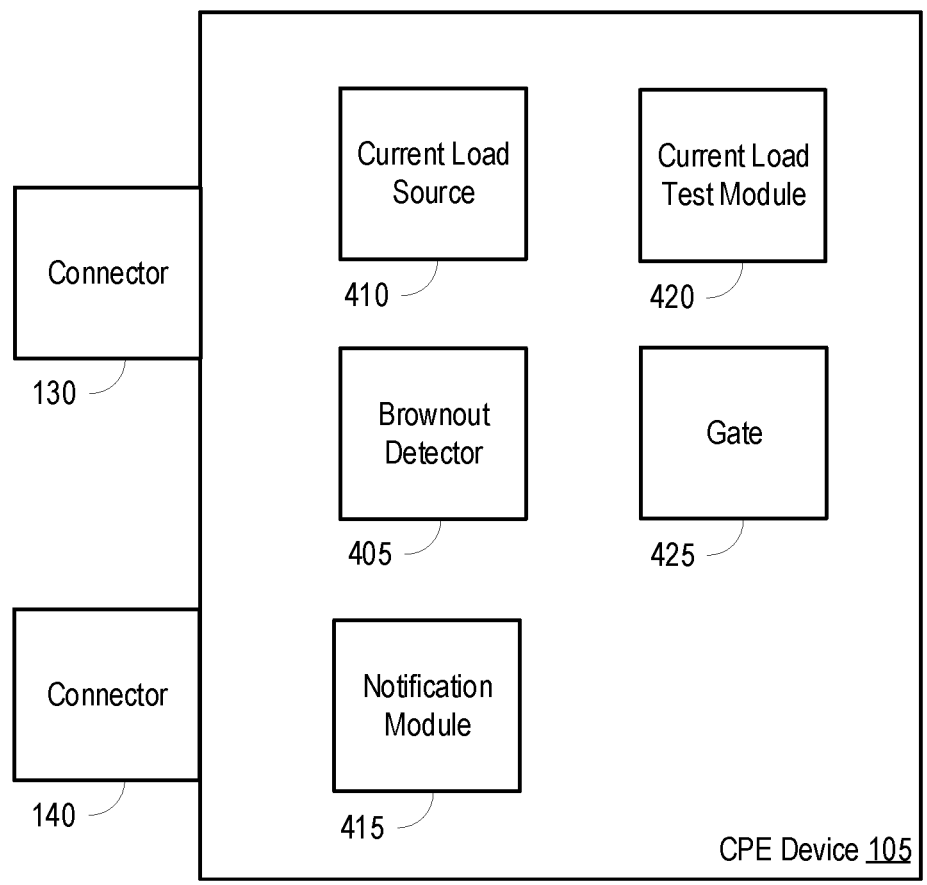
FIG. 4 is a block diagram illustrating an example CPE device that is operable to facilitate current draw capacity testing using a brownout detector.

FIG. 4 is a block diagram illustrating an example CPE device 105 that is operable to facilitate current draw capacity testing using a brownout detector 405. The CPE device 105 may include a brownout detector 405, a current load source 410, a notification module 415, a current load test module 420, a gate 425, a connector 130, and a connector 140.

In embodiments, the CPE device 105 shown in FIG. 4 may test current draw capacity of an unknown USB supply (e.g., a USB port of a device to which the CPE device 105 is connected) using progressive loading. When progressive (i.e., stepped) loading is used, a predetermined current load (e.g., 1 A) may be sourced from current load source 410 by adding more functions in a controlled manner, and the current load test module 420 may monitor the brownout detector 405 (e.g., via an input/output such as a GPIO (general purpose input/output)). For example, at each respective one stage of one or more stages, the current load source 410 may increase a sourced amount of current (e.g., current sourced by SW or current sourced by the unknown USB supply may be increased by incremental amounts), and at the end of the respective stage, the current load test module 420 may read an output from the brownout detector 405 and determine whether a fault condition has been flagged. If a fault condition has not been flagged, the current load test module 420 may initiate a next stage at which the sourced amount of current is again increased and a check is again made for a fault condition. The current load test module 420 may determine that the unknown USB supply cannot supply a predetermined current when the current load test module 420 determines that a fault condition has been flagged.

In embodiments, the brownout detector 405 and a gate 425 may be utilized to detect a fault. In embodiments, the brownout detector 405 may be used to detect, for example, a 3V negative going threshold. The potential divider may be set to provide a 3.08V level when the VBUS+5V rail passes 4.85V drop (it should be understood that these threshold levels may be adjusted to suit). The brownout detector 405 input to the system-on-chip (SoC) (set to be an interrupt) may be monitored during the test period (e.g., by the current load test module 420). The brownout detector 405 signal may be asserted within, for example, 20 us of the brownout threshold voltage being reached and may remain asserted for, for example, 220 ms. If the DC can withstand the load, then there is no change. If a drop appears beyond the predetermined brownout threshold, then a negative pulse will occur from the brownout detector 405 into the gate 425 (e.g., a logic gate such as AND gate U12001). This logic function may end the HW pulsed test immediately and may prevent overcurrent on the USB port of the connected device (e.g., USB port 115 of the display device 110 of FIG. 1). A signal may also be apparent on an input/output showing a fault condition has been flagged. The current load test module 420 may use this to flag a message on the display device 110 graphics over an HDMI connection between the CPE device 105 and the display device 110.

Figure 5:
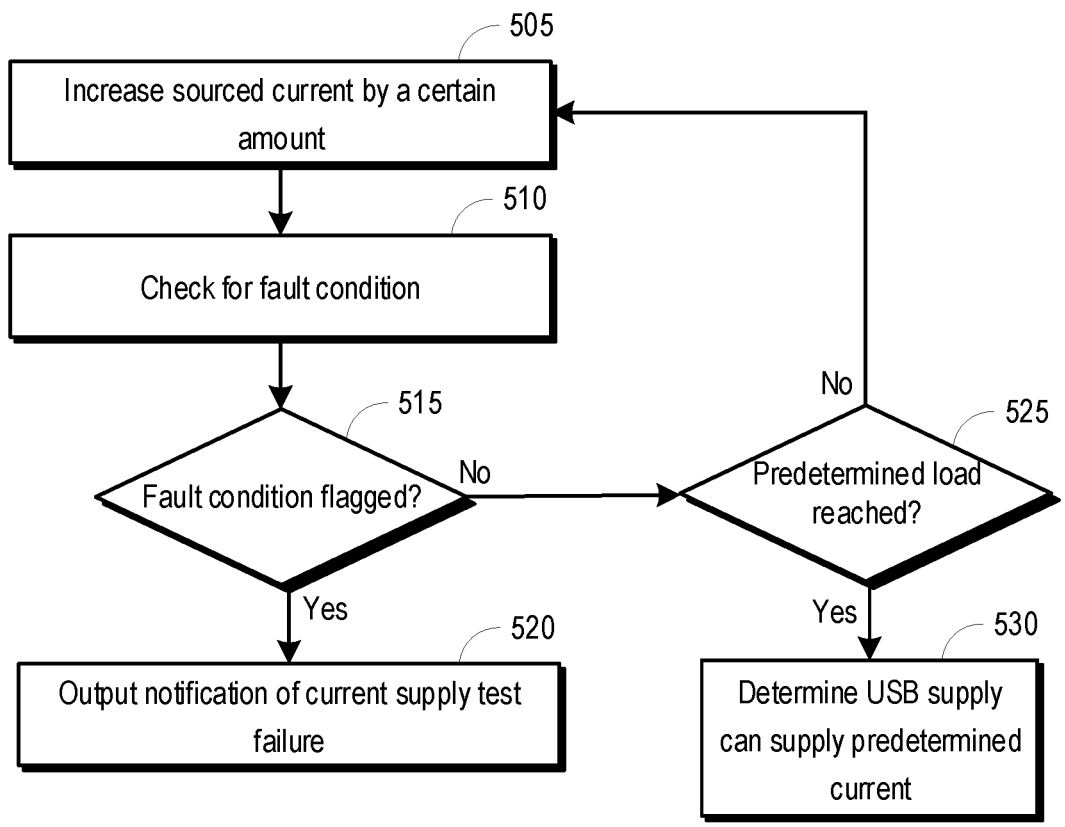
FIG. 5 is a flowchart illustrating an example process operable to facilitate current draw capacity testing using a brownout detector.

FIG. 5 is a flowchart illustrating an example process 500 operable to facilitate current draw capacity testing using a brownout detector. The process 500 may be carried out, for example, by a CPE device 105. The process 500 may begin when a procedure is initiated for testing an unknown USB supply to which the CPE device 105 is connected. For example, the testing procedure may be initiated when the CPE device 105 is connected to the USB supply (e.g., a USB port 115 of the display device 110 of FIG. 1) through a USB connection and/or an HDMI connection. The process 500 may begin at 505, where current sourced to the CPE device is increased by a certain amount. In embodiments, the current load source 410 of FIG. 4 may increase a sourced amount of current (e.g., current sourced by SW or current sourced by the unknown USB supply may be increased by an incremental amount), wherein the amount by which the sourced current is increased is less than a predetermined current that needs to be supplied to the CPE device 105.

At 510, a check may be made for a fault condition. In embodiments, the current load test module 420 of FIG. 4 may read an output from a brownout detector 405 of FIG. 4 and determine whether a fault condition has been flagged. The brownout detector 405 may be configured to output a signal on an input/output showing a fault condition has been flagged when a fault condition is detected in response to the increased current.

At 515, a determination may be made whether a fault condition has been flagged.

If, at 515, the determination is made that a fault condition has been flagged, the process 500 may proceed to 520. At 520, the CPE device 105 may output a notification of the current supply test failure. In embodiments, the CPE device 105 may output a notification instructing a user to plug the CPE device 105 into an alternative PSU (power supply unit). For example, the CPE device 105 may generate a visual and/or audible notification, and the visual and/or audible notification may be output from the CPE device 105 to a display device. The visual and/or audible notification may be displayed, or otherwise output, by the display device. As another example, the CPE device 105 may utilize one or more light indicators (e.g., LED(s)) to output an LED indication associated with the failed power test.

If, at 515, the determination is made that a fault condition has not been flagged, the process 500 may proceed to 525. At 525, a determination may be made whether the sourced current load resulting from the increase at 505 has reached the predetermined current load that needs to be supplied to the CPE device 105 by the USB supply. If the predetermined current load has not been reached, the sourced current may again be increased by a certain amount at 505. If the predetermined current load has been reached, the CPE device 105 may determine that the USB supply to which the CPE device 105 is connected can supply the predetermined current at 530. As a result of the determination that the USB supply is capable of supplying the predetermined current, the CPE device 105 may end the current supply test.

Figure 6:
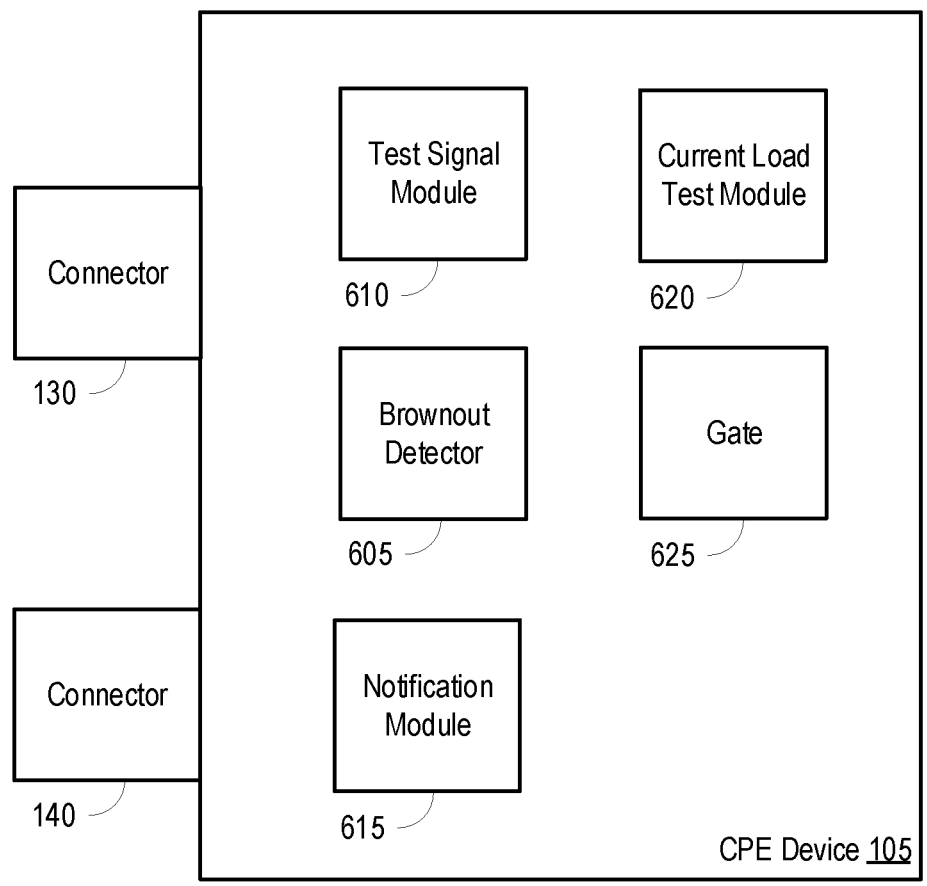
FIG. 6 is a block diagram illustrating an example CPE device that is operable to facilitate current draw capacity testing through pulsed current loading.

FIG. 6 is a block diagram illustrating an example CPE device 105 that is operable to facilitate current draw capacity testing through pulsed current loading. The CPE device 105 may include a brownout detector 605, a test signal module 610, a notification module 615, a current load test module 620, a gate 625, a connector 130, and a connector 140.

In embodiments, the CPE device 105 shown in FIG. 6 may test current draw capacity of an unknown USB supply (e.g., a USB port of a device to which the CPE device 105 is connected) using pulsed current loading. A test signal module 610 may generate a test signal (e.g., from a processor) and send out the test signal on an input/output (e.g., GPIO). Steady state SW may be used. The test signal module 610 (e.g., SW loader) may generate a first load (e.g., ~400 mA) and then apply a known load (e.g., ~600 mA) to create a total load of, for example, ~1 A. It should be understood that the test signal module 610 may generate various loads depending upon the use case. As an example, AON_GPIO_16 may be driven at ~10 KHz for a certain period (e.g., ~1-10 ms), and this test signal may be passed through a logic gate (e.g., gate 625), where no brownout fault condition is flagged. Varying frequencies and mark to space ratios can be used to load the port with differing conditions/correct draw on a power supply to find the optimum/minimum current required to trip the port (drop the voltage on the short duration pulse). The test signal may be applied to switching (e.g., Q4002/Q4003) on the pulsed signal, for example, to the 'Heavy on board load.' The load may be ~8.3 R to mimic 600 mA (totaling the 1 A test limit). The switched 1 A signal may prevent the full load energy being present on the resistive load, current will flow during each pulse, thereby applying a load on the voltage.

The test signal module 610 may generate a test signal for each of one or more test scenarios that are applied to the unknown USB supply in a series of one or more stages. For example, the test signal module 610 may generate and apply a test signal, and the current load test module 620 may determine whether the test signal creates a fault condition. The test signal may be a pulsed signal that is applied at a frequency that is lower than a predetermined frequency which may create an overcurrent condition at the USB supply. If the current load test module 620 determines that a test signal creates a fault condition (e.g., at the brownout detector 605), then the current load test module 620 may cause the test signal module 610 to stop the pulsed test signal, and the current load test module 620 may determine that the USB supply cannot supply the predetermined current.

In embodiments, the brownout detector 605 and a gate 625 may be utilized to detect a fault. In embodiments, the brownout detector 605 may be used to detect, for example, a 3V negative going threshold. The potential divider may be set to provide a 3.08V level when the VBUS+5V rail passes 4.85V drop (it should be understood that these threshold levels may be adjusted to suit). The brownout detector 605 input to the system-on-chip (SoC) (set to be an interrupt) may be monitored during the test period (e.g., by the current load test module 620). The brownout detector 605 signal may be asserted within, for example, 20 us of the brownout threshold voltage being reached and may remain asserted for, for example, 220 ms. If the DC can withstand the load, then there is no change. If a drop appears beyond the predetermined brownout threshold, then a negative pulse will occur from the brownout detector 605 into the gate 625 (e.g., a logic gate such as AND gate U12001). This logic function may end the HW pulsed test immediately and may prevent overcurrent on the USB port of the connected device (e.g., USB port 115 of the display device 110 of FIG. 1). A signal may also be apparent on an input/output showing a fault condition has been flagged. The current load test module 620 may use this to flag a message on the display device 110 graphics over an HDMI connection between the CPE device 105 and the display device 110.

Figure 7:
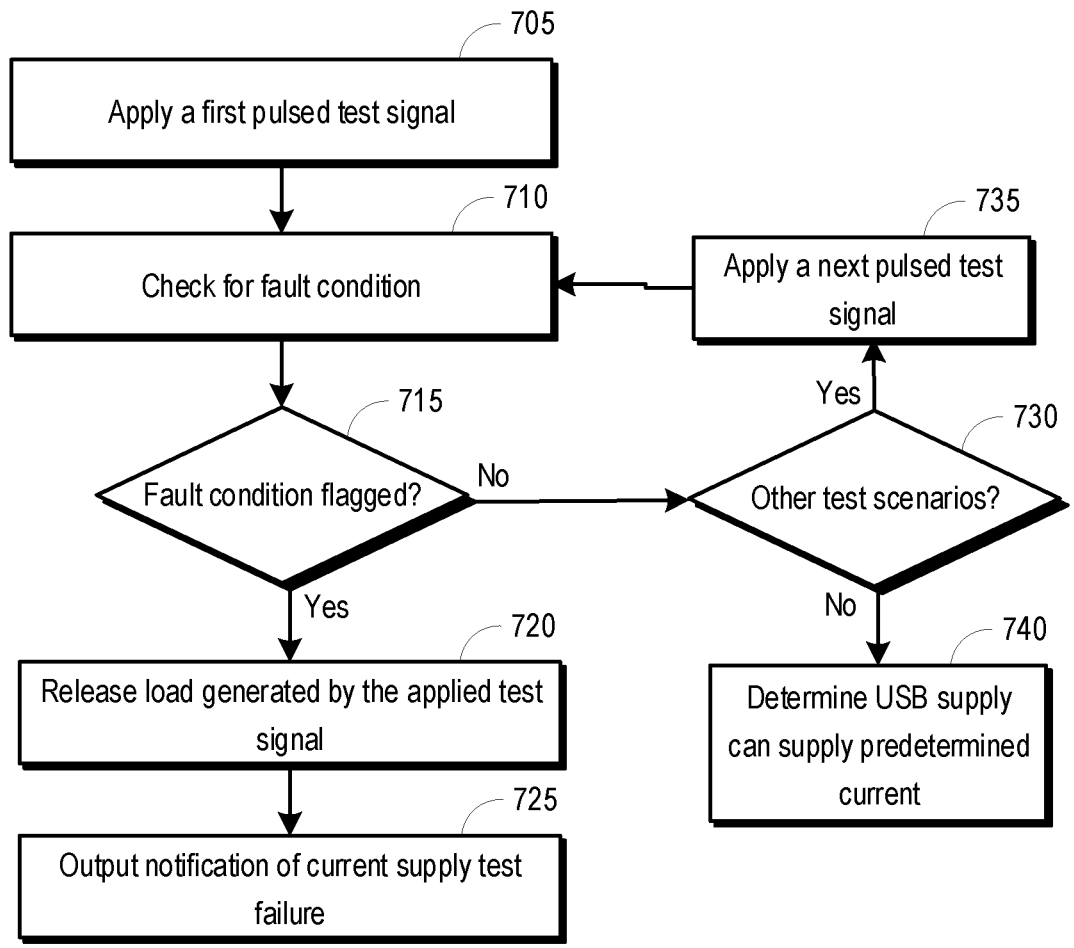
FIG. 7 is a flowchart illustrating an example process operable to facilitate current draw capacity testing using a pulsed test signal.

FIG. 7 is a flowchart illustrating an example process 700 operable to facilitate current draw capacity testing using a pulsed test signal. The process 700 may be carried out, for example, by a CPE device 105. The process 700 may begin when a procedure is initiated for testing an unknown USB supply to which the CPE device 105 is connected. For example, the testing procedure may be initiated when the CPE device 105 is connected to the USB supply (e.g., a USB port 115 of the display device 110 of FIG. 1) through a USB connection and/or an HDMI connection. The process 700 may begin at 705, where a first pulsed test signal is applied. In embodiments, the test signal module 610 of FIG. 6 may generate a test signal for each of one or more test scenarios that are applied to an unknown USB supply in a series of one or more stages. For example, the test signal module 610 may generate and apply a pulsed test signal. The pulsed test signal may be sent out on an input/output (e.g., GPIO). The test signal module 610 (e.g., SW loader) may generate a first load (e.g., ~400 mA) and then apply a known load (e.g., ~600 mA) to create a total load of, for example, ~1 A. It should be understood that the test signal module 610 may generate various loads depending upon the use case.

At 710, a check may be made for a fault condition. In embodiments, a current load test module 620 of FIG. 6 may read an output from a brownout detector 605 of FIG. 6 and determine whether a fault condition has been flagged. The brownout detector 605 may be configured to output a signal on an input/output showing a fault condition has been flagged when a fault condition is detected in response to the pulsed test signal.

At 715, a determination may be made whether a fault condition has been flagged.

If, at 715, the determination is made that a fault condition has been flagged, the process 700 may proceed to 720. At 720, the load generated by the applied test signal may be released.

At 725, the CPE device 105 may output a notification of the current supply test failure. In embodiments, the CPE device 105 may output a notification instructing a user to plug the CPE device 105 into an alternative PSU (power supply unit). For example, the CPE device 105 may generate a visual and/or audible notification, and the visual and/or audible notification may be output from the CPE device 105 to a display device. The visual and/or audible notification may be displayed, or otherwise output, by the display device. As another example, the CPE device 105 may utilize one or more light indicators (e.g., LED(s)) to output an LED indication associated with the failed power test.

If, at 715, the determination is made that a fault condition has not been flagged, the process 700 may proceed to 730. At 730, a determination may be made whether other test scenarios are to be tested. For example, the CPE device 105 may be configured to generate a test signal for each of one or more test scenarios that are applied to an unknown USB supply in a series of one or more stages. If there is at least one other test scenario to be tested, a next pulsed test signal associated with a next test scenario may be applied at 735. If there is no other scenario to be tested, the CPE device 105 may determine that the USB supply to which the CPE device 105 is connected can supply the predetermined current at 740. As a result of the determination that the USB supply is capable of supplying the predetermined current, the CPE device 105 may end the current supply test.

Figure 8:
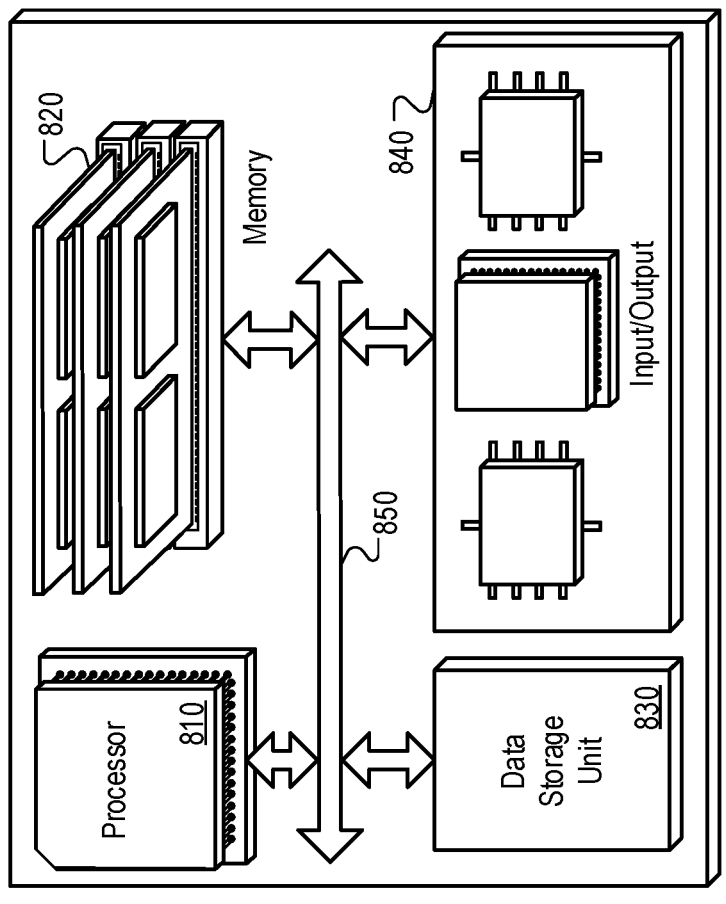
FIG. 8 is a block diagram of a hardware configuration operable to facilitate current draw capacity testing.

FIG. 8 is a block diagram of a hardware configuration 800 operable to facilitate current draw capacity testing. It should be understood that the hardware configuration 800 can exist in various types of devices. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks and/or one or more access devices and/or stations.

Those skilled in the art will appreciate that the invention improves upon methods and systems for preventing an overcurrent shutdown of a USB port while measuring the ability to pull a predetermined current from an unknown USB supply. In embodiments, an unknown USB supply (e.g., a USB port of a television) that is connected to a CPE (customer premise equipment) device (e.g., a STB (set-top box)) may be tested to determine a current draw capacity of the USB supply. For example, the CPE device may test the USB supply to determine whether the USB supply is capable of supplying a predetermined current (e.g., 1 A). If the determination is made that the USB supply is not able to supply the predetermined current, an end-user may be instructed to plug an alternative PSU (power supply unit) into the CPE device, wherein the alternative PSU is capable of supplying the predetermined current to the CPE device. For example, the CPE device may output an indication that an alternative PSU should be used via a graphics output to a display device through an HDMI (high-definition multimedia interface) connection or via an LED indication using one or more LEDs at the CPE device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method of a device to test a capacity of a universal serial bus (USB) supply comprising:
   initiating a pulsed current draw capacity test of a pulsed current draw by a current load source of the device from the USB supply provided through a USB port of the USB supply to test a capacity of the USB supply to supply a predetermined current through a USB port of the USB supply;
   generating a predetermined current load to apply a pulsed current load, at a duration to prevent an overcurrent trip from fully activating, to the USB supply providing power to the device through the USB port during the pulsed current draw capacity test to test the capacity of the USB supply to provide the predetermined current from the USB port to the device during normal operation of the device, wherein the pulsed current load is generated by a current load source of the device by periodically removing the predetermined current load, and wherein the current load source progressively increases the pulsed current draw from the USB supply by the device by adding more functions in a controlled manner to generate the pulsed current load applied by the current load source to the USB supply;
   determining whether the USB supply is capable of supporting the pulsed current load applied by the current load source to the USB supply through the USB port to provide the predetermined current to the device during the normal operation of the device; and
   outputting a notification when the determination is made that the USB supply is not capable of supporting the pulsed current load applied by the current load source to the USB supply through the USB port to provide the predetermined current from the USB supply to the device during the pulsed current draw capacity test, wherein the notification includes an instruction to plug an alternative power supply into the device.

2. The method of claim 1, wherein the pulsed current load is incrementally increased in stages.

3. The method of claim 2, wherein determining whether the USB supply is capable of supporting the pulsed current load applied comprises:
   reading a voltage value at a power monitor of the device after each increase of the pulsed current load; and
   determining that the USB supply is not capable of supporting the pulsed current load applied when the voltage value drops below a threshold.

4. The method of claim 2, wherein determining whether the USB supply is capable of supporting the pulsed current load applied comprises:
   monitoring an output of a brownout detector of the device; and
   determining that the USB supply is not capable of supporting the pulsed current load applied when a fault condition is flagged by the brownout detector.

5. The method of claim 1, wherein the outputting is to a display device.

6. The method of claim 5, wherein the notification comprises one or more instructions to cause the display device to output a message instructing a user to connect the device to an alternate power supply unit.

7. The method of claim 1, where the notification comprises a visual notification, an audible notification, or both.

8. A device for use in testing a capacity of a universal serial bus (USB) supply comprising:
   a memory;
   a processor coupled to the memory storing one or more instructions that when executed by the processor cause the device to:
     initiate a pulsed current draw capacity test of a pulsed current draw by a current load source of the device from the USB supply provided through a USB port of the USB supply to test a capacity of the USB supply to supply a predetermined current through the USB port to the device needed during normal operation of the device;
     generating a predetermined current load to apply a pulsed current load, at a duration to prevent an overcurrent trip from fully activating, to the USB supply providing power to the device through the USB port during the pulsed current draw capacity test to test the capacity of the USB supply to provide the predetermined current from the USB port to the device during normal operation of the device, wherein the pulsed current load is generated by the current load source of the device by periodically removing the predetermined current load, and wherein the current load source progressively increases the pulsed current draw from the USB supply by the device by adding more functions in a controlled manner to generate the pulsed current load applied by the current load source to the USB supply;
     determine whether the USB supply is capable of supporting the pulsed current load applied by the current load source to the USB supply through the USB port to provide the predetermined current to the device during the normal operation of the device; and
     output a notification when the determination is made that the USB supply is not capable of supporting the pulsed current load applied by the current load source to the USB supply through the USB port to provide the predetermined current from the USB supply to the device during the pulsed current draw capacity test, wherein the notification includes an instruction to plug an alternative power supply into the device.

9. The device of claim 8, wherein the pulsed current load comprises a progressive current load applied by the current load source to the USB supply, and wherein the amount of the pulsed current load applied by the current load source is incrementally increased in stages.

10. The device of claim 9, wherein determining whether the USB supply is capable of supporting the pulsed current load applied comprises:
    reading a voltage value at a power monitor of the device after each increase of the pulsed current load; and
    determining that the USB supply is not capable of supporting the pulsed current load applied by the current load source when the voltage value drops below a threshold.

11. The device of claim 9, wherein determining whether the USB supply is capable of supporting the pulsed current load applied comprises:
    monitoring an output of a brownout detector of the device; and
    determining that the USB supply is not capable of supporting the pulsed current load applied when a fault condition is flagged by the brownout detector.

12. The device of claim 8, wherein the output is to a display device.

13. The device of claim 12, wherein the notification comprises one or more instructions to cause the display device to output a message instructing a user to connect the customer premise equipment device to an alternate power supply unit.

14. The device of claim 8, wherein the notification comprises a visual notification, an audible notification, or both.

15. One or more non-transitory computer readable media of a device having instructions operable to cause one or more processors to perform the operations comprising:
   initiating a pulsed current draw capacity test of a pulsed current draw by a current load source of the device from a USB supply provided through a USB port of the USB supply to test a capacity of the USB supply to supply a predetermined current through a USB port of the USB supply;
   generating a predetermined current load to apply a pulsed current load, at a duration to prevent an overcurrent trip from fully activating, to the USB supply providing power to the device through the USB port during the pulsed current draw capacity test to test the capacity of the USB supply to provide the predetermined current from the USB port to the device during normal operation of the device, wherein the pulsed current load is generated by a current load source of the device by periodically removing the predetermined current load, and wherein the current load source progressively increases the pulsed current draw from the USB supply by the device by adding more functions in a controlled manner to generate the pulsed current load applied by the current load source to the USB supply;
   determining whether the USB supply is capable of supporting the pulsed current load applied by the current load source to the USB supply through the USB port to provide the predetermined current to the device during the normal operation of the device; and
   outputting a notification when the determination is made that the USB supply is not capable of supporting the pulsed current load applied by the current load source to the USB supply through the USB port to provide the predetermined current from the USB supply to the device during the pulsed current draw capacity test, wherein the notification includes an instruction to plug an alternative power supply into the device.

16. The one or more non-transitory computer-readable media of claim 15, wherein the pulsed current load is incrementally increased in stages.

17. The one or more non-transitory computer-readable media of claim 16, wherein determining whether the USB supply is capable of supporting the pulsed current load applied comprises:
   reading a voltage value at a power monitor of the device after each increase of the pulsed current load; and
   determining that the USB supply is not capable of supporting the pulsed current load applied when the voltage value drops below a threshold.

18. The one or more non-transitory computer-readable media of claim 16, wherein determining whether the USB supply is capable of supporting the pulsed current load applied comprises:
   monitoring an output of a brownout detector of the device; and
   determining that the USB supply is not capable of supporting the pulsed current load applied when a fault condition is flagged by the brownout detector.

19. The one or more non-transitory computer-readable media of claim 14, wherein the notification comprises a visual notification, an audible notification, or both.

20. The one or more non-transitory computer-readable media of claim 14, wherein at least one of:
   the outputting is to a display device; and
   the notification comprises one or more instructions to cause a display device to output a message instructing a user to connect the device to an alternative power unit.

* * * * *